United States Patent
Muchherla et al.

(10) Patent No.: US 11,994,947 B2
(45) Date of Patent: May 28, 2024

(54) MULTI-LAYER CODE RATE ARCHITECTURE FOR SPECIAL EVENT PROTECTION WITH REDUCED PERFORMANCE PENALTY

(71) Applicant: Micron Technology, Inc., Boise, ID (US)

(72) Inventors: Kishore Kumar Muchherla, Fremont, CA (US); Huai-Yuan Tseng, San Ramon, CA (US); Mustafa N. Kaynak, San Diego, CA (US); Akira Goda, Tokyo (JP); Sivagnanam Parthasarathy, Carlsbad, CA (US); Jonathan Scott Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/884,432

(22) Filed: Aug. 9, 2022

(65) Prior Publication Data
US 2024/0054048 A1  Feb. 15, 2024

(51) Int. Cl.
*G06F 11/10* (2006.01)
*G06F 11/07* (2006.01)

(52) U.S. Cl.
CPC ...... *G06F 11/1068* (2013.01); *G06F 11/0772* (2013.01); *G06F 11/0793* (2013.01)

(58) Field of Classification Search
CPC ............. G06F 11/1068; G06F 11/0772; G06F 11/0793
See application file for complete search history.

(56) References Cited

U.S. PATENT DOCUMENTS

| | | | |
|---|---|---|---|
| 11,417,405 B2* | 8/2022 | Vashi | G11C 16/26 |
| 2011/0107049 A1* | 5/2011 | Kwon | G06F 11/004 |
| | | | 711/E12.002 |
| 2012/0204077 A1* | 8/2012 | D'Abreu | G06F 11/1012 |
| | | | 714/755 |
| 2016/0162352 A1* | 6/2016 | Singhai | G06F 11/1048 |
| | | | 714/773 |
| 2020/0310930 A1* | 10/2020 | Tzoufras | G11C 29/42 |

OTHER PUBLICATIONS

Y.-D. Chih et al., "Design Challenges and Solutions of Emerging Nonvolatile Memory for Embedded Applications," 2021 IEEE International Electron Devices Meeting (IEDM), San Francisco, CA, USA, 2021, pp. 2.4.1-2.4.4, (Year: 2021).*

* cited by examiner

*Primary Examiner* — Cynthia Britt
(74) *Attorney, Agent, or Firm* — Greenberg Traurig

(57) ABSTRACT

A system related to providing multi-layer code rates for special event protection with reduced performance penalty for memories is disclosed. Based on an impending stress event, extra error correction code data is utilized to encode user data obtained from a host. The user data and first error correction code data are written to a first block and the extra error correction code data is written to a second block. Upon stress event completion, pages having user data with the extra error correction code data are scanned. If pages of the first block are unable to satisfy reliability requirements, a touch-up process is executed on each page in the first block to reinstate the first block so that the extra error correction code data is no longer needed. The extra error correction code data is deleted from the second block and the second block is made available for user data.

20 Claims, 6 Drawing Sheets

MULTI-LAYER CODE RATE ARCHITECTURE FOR SPECIAL EVENT PROTECTION WITH REDUCED PERFORMANCE PENALTY

FIELD OF THE TECHNOLOGY

At least some embodiments disclosed herein relate to memory devices in general, and more particularly, but not limited to, a multi-layer code rate architecture for special event protection with reduced performance penalty.

BACKGROUND

Typically, a computing device or system includes one or more processors and one or more memory devices, such as memory chips or integrated circuits. The memory devices may be utilized to store data that may be accessed, modified, deleted, and/or replaced. The memory devices may be, for example, non-volatile memory devices that retain data irrespective of whether the memory devices are powered on or off. Such non-volatile memories may include, but are not limited to, read-only memories, solid state drives, and NAND flash memories. Additionally, the memory devices may be volatile memory devices, such as, but not limited to, dynamic and/or static random-access memories, which retain stored data while powered on, but are susceptible to data loss when powered off.

Based on receipt of an input, the one or more processors of the computing device or system may request that a memory device of the computing system retrieve stored data associated with or corresponding to the input. In certain scenarios, the data retrieved from the memory device may include instructions, which may be executed by the one or more processors to perform various operations and/or may include data that may be utilized as inputs for the various operations. In instances where the one or more processors perform operations based on instructions from the memory device, data resulting from the performance of the operations may be subsequently stored into the memory device for future retrieval.

Notably, various types of non-volatile storage devices may be utilized to store data. Certain non-volatile storage devices may include NOT-AND ("NAND") flash memory devices. NAND flash is a type of flash memory that may be constructed using NAND logic gates. A solid-state drive is an example of a non-volatile data storage device that uses solid-state memory to store data in, for example, non-volatile NAND-based flash memory chips. While NAND-based flash memories are generally reliable, NAND-based flash memories are not error free. In certain instances, an error correction code is used to correct bit errors in the stored data by providing a capability that enables reconstruction of the data without errors.

Errors in data storage may occur for a variety of reasons. For example, errors may be caused by extremes in temperature, noise at power rails, voltage threshold disturbances during reading or writing of neighboring cells, or retention loss due to leakage within the cells. As a result, various techniques and processes have been developed to recover stored data that contains errors. As an example, error correction codes may be used in flash memories to recover stored data if an error is detected. An error correction code may supplement user data with parity bits that store additional information so that the data can be recovered if one or more data bits are corrupted. In general, the number of data bit errors that can be corrected in the stored data increases as the number of parity bits in the error correction code increases.

In memory devices, the user data may be stored in a memory location of the memory device, along with the error correction code for the data. This permits the data and error correction code to be written to the memory location in a single write operation or read from the memory location in a single read operation. Typically, error correction codes are implemented in the flash memory controller. While the use of traditional error correction code capabilities provides benefits, such as the ability to recover data subject to errors, current techniques for providing error correction may do so by consuming excess program erase cycles, increasing wear on the memory devices, requiring the use of lower code rates to accommodate the error correction capabilities, incorporating the use of intensive garbage collection processes, and using excess memory-related operations to correct the user data.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
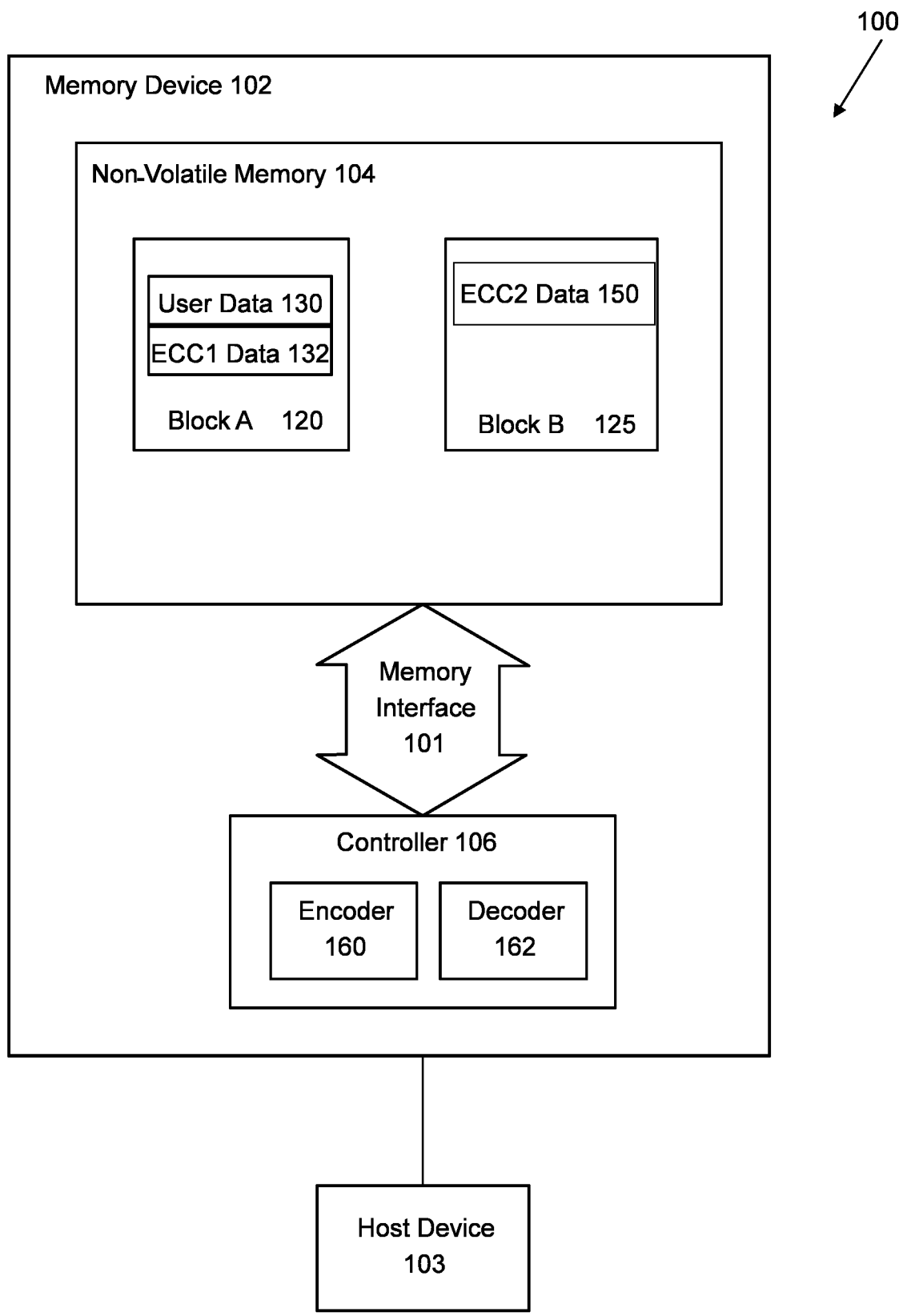
FIG. 1 shows a memory device that uses a multi-layer code rate architecture to provide special event protection using error correction with reduced performance penalty in accordance with embodiments of the present disclosure.

The following disclosure describes various embodiments for memory devices implementing a multi-layer (also referred to as multi-level) code rate architecture that provides error correction of data based on the occurrence of special events, while also ensuring reduced performance penalties for the memory devices. At least some embodiments of the present disclosure relate to non-volatile memories, such as flash memory devices. At least some embodiments herein relate to data stored in a memory device based on encoding the data using two levels of parity protection. The memory devices may, for example, store data for a host device (e.g., a computing device, a server, a computing device of an autonomous vehicle, or other computing device that accesses data stored in a memory device). In certain embodiments, for example, the memory device may be a solid-state drive (SSD) mounted in an electric vehicle.

In one example, a NAND flash memory device stores data (e.g., pages) that is programmed in various modes: an SLC (single level cell) mode, an MLC (multi-level cell) mode, a TLC (triple level cell) mode, a QLC (quad level cell) mode, and/or other level modes. When configured in the SLC mode, for example, each memory cell stores one bit of data. When configured in the MLC mode, each memory cell stores two bits of data. When configured in the TLC mode, each memory cell stores three bits of data. When configured in the QLC mode, each memory cell stores four bits of data. When the number of bits stored in a cell increases, the likelihood of errors in the data retrieved from the memory cell also increases. The time required to program a memory cell varies depending on the mode. For example, programming in the QLC mode is significantly slower than programming in SLC mode. In particular, each QLC cell has 16 possible states called levels (e.g., levels 0 to 15). Level 0 may be an erased state (i.e., not programmed).

Errors in memory devices may occur under a variety of difference scenarios and/or conditions. For example, programming of the QLC cells can be done in one pass, but because of cell-to-cell coupling (which causes interference), if programming is done in only one pass, the error rate will be high. As an example of an error, in some cases when one cell is programmed to a level 1, and a neighboring cell is programmed to a higher level, there may be coupling interference, which may cause the level 1 to move to a higher level. Such a move may result in an error. QLC cells can be programmed in two passes to reduce the above negative effects. In the first pass, coarse programming may be performed. In the second pass, finer programming may be performed to tune the coarse programming more finely. Threshold voltage distributions for the cells may be tighter and more usable when using two-pass programming (e.g., 16-16 programming).

As another example, in certain cases, a host device sends data to a flash memory device at a faster rate than the incoming data can be written in QLC memory, especially if programming with the two-pass approach above. As an example, if a user is recording high-definition video on a mobile device, the fast rate of data provided to the memory device for storage cannot be slowed down. If the data is not saved sufficiently fast (e.g., due to slow QLC programming), then data may be lost due to the real-time recording nature of this activity. In some cases, memory devices attempt to remedy this problem by initially writing incoming user data to memory cells operating in an SLC mode. This is because programming (writing) in SLC mode can be performed relatively fast, and thus an incoming real-time stream of data can be saved without data loss. In some approaches, a memory device has dedicated SLC blocks to store incoming data. Alternatively, SLC blocks can be assigned dynamically. For example, each block in a memory device can be selectively operated in an SLC or QLC mode.

Notably, error rates may continue to increase during the life of a memory device as memory cells are programmed and erased because of the wear. For example, the errors may occur between storing data into memory cells and retrieving data from memory cells. To facilitate the retrieval of error-free data, a controller (e.g., used in the SSD) can encode data (e.g., user data) received from a host device using an error correction code (ECC), such as a low-density parity-check (LDPC) code, and store the encoded data in the memory cells of the memory device. The controller or other component may decode the encoded data retrieved from the memory cells to remove or reduce errors affecting the user data. ECC is, for example, additional information added to user data that permits the correction of errors (e.g., the addition of 10% or 20% of parity bits or data to the user data). The additional ECC information may be utilized by an error correction engine (e.g., an encoder and decoder implemented in the controller of the SSD).

Despite the foregoing techniques and processes to correct errors in user date, certain causes of errors may require further error correction capabilities. For example, errors may occur when a memory device manufacturer provides a memory device to a customer, who then incorporates the memory device onto another device, chip, or system. For example, the customer may solder the memory device purchased from the manufacturer onto a printed circuit board containing other componentry, such as, but not limited to, processors, graphics chips, and other storage devices. The act of soldering the memory device onto the printed circuit board may amount to a stress event and infrared reflow resulting from the soldering process may generate errors in the data (e.g., user data) stored in the memory device. Infrared reflow may subject the NAND to higher temperatures, which risks data loss when operating at a default code rate. In certain instances, NAND may downgrade the bits per cell to achieve large error rates, however, doing so comes at the loss of capacity of the memory device. After a reflow event occurs, a system firmware garbage collection process may collect the data to recover the physical capacity of the memory.

A technique to assist in error recovery of user data resulting from a stress event (e.g., infrared reflow) is to utilize smaller code rates for memory blocks, such as by having ECCs occupy a greater percentage of the total memory in a block. For example, if a memory block has 90% user data and 10% ECC data, the code rate may be 0.9. If the percentage of ECC data is increased to 20% and the user data occupies 80% this results in a code rate of 0.8. As a result, the error correction capability may be increased at the expense of losing user data capacity in the block. Larger ECCs may need to be embedded with user data in a memory block in order to sustain such stress events. After the reflow event occurs, retrieving the capacity utilized for the larger ECC may require the use of a garbage collection process. A garbage collection process may, for example, involve reading data into an application specific integrated circuit ("ASIC") and utilizing an LDPC decoder to recover the user data with the assistance of the larger ECC in the memory block being read. The user data may then be encoded at a larger code rate (i.e., a default ECC) and then written into a separate block. With a memory and/or system utilizing a garbage collection process, to write user data to a block before the stress event (e.g., infrared reflow or other high reliability stress event) and keep it after reflow, two blocks of data are written. When the data is written into a separate block from the original block, the extra ECC that made the ECC larger is discarded and the memory undergoes two program erase cycles per unit data, which contributes to wear of the memory device.

While the foregoing technique incorporating the use of garbage collection is helpful in reconstructing data, the need for extra program erase cycles, additional memory operations (e.g., write operations, etc.), and memory capacity leaves rooms for enhancement. According to the present disclosure, the creation of a multi-layer code rate architecture to facilitate special event protection with reduce performance penalty provides such enhancement. In particular, a combination of smaller code rate (with extra ECC) and a multi-layer implementation (with extra ECC written to a separate block rather than the same block as the user data) avoids the need for garbage collecting user data to recover user data in response to errors being present in memory blocks. An exemplary embodiment of the present disclosure includes utilizing a host to provide a host notification to a memory device of an impending stress event (e.g., infrared reflow or other stress event). In response to the notification of the impending stress event, the system may utilize extra ECC (e.g., ECC2) for host data. In certain embodiments, the extra ECC may be implemented by utilizing a multi-layer code architecture. For example, user data and ECC (e.g., ECC1) at a default code rate may be written to a first block (e.g., Block A) and the extra ECC may be written to second block (e.g., Block B). In response to a host notification that the stress event has completed, the system may scan the data with the extra ECC (e.g., ECC2) encoding. In certain embodiments, the scanning may be conducted on each page in the first memory block.

The system may determine whether each memory page is capable of satisfying a threshold reliability requirement for the memory. If a particular page is determined to not be able to satisfy the reliability requirement without the extra ECC (e.g., ECC2), the page is put through a touch-up process, such as by a controller of the memory device. In certain embodiments, touching-up may comprise rewriting the data on already written pages of the memory in an effort to reset the reliability margins so that the reliability requirements are satisfied. For example, a controller of the memory may read each memory page and utilize the touch-up process to rewrite the data to the same first block with the ECC (e.g., ECC1). If memory pages are determined to satisfy the threshold reliability requirements, the touch-up process may be avoided. In certain embodiments, although touch-ups avoid the need to rewrite data to a new block (the data is rewriting to the same block), the touch-up process may cause a certain level of memory performance penalty due to the write operations performed on the memory. Nevertheless, conducting the touch-up process on an as-needed basis avoids such overhead. Once the first block is touched up to exhibit the appropriate reliability margins, the extra ECC (e.g., ECC2) may be deleted from the second block (e.g., Block B) and the capacity of the second block may be reclaimed and may be joined to a pool of blocks that may be utilized to store user data.

The foregoing process incorporating the touch-up process does not result in significant wear to the memory block. Indeed, the touch-up process reinstates the operating state/health of the memory block such that the extra ECC is no longer necessary and the memory blocks that provide the extra ECC may be repurposed to store user data. Notably, the foregoing process also utilizes fewer program erase cycles because the recovered user data is rewritten to the same block that contained the errors in user data instead of writing the user data to a separate block. The foregoing process also frees up memory capacity for user data and takes advantage of multi-layer code rates to counteract the effects of special events, such as infrared reflows or other events that may result in trauma to the memory device. As a result, the foregoing process provides significant enhancement to ECC technologies, while also enhancing memory capacity, error correction capabilities, and reducing performance penalties.

Referring now also to FIG. 1, FIG. 1 shows an architecture for a memory device 102 that uses a multi-layer code rate architecture to provide special event protection, while also ensuring reduced memory performance penalties in accordance with embodiments of the present disclosure. The memory device 102 and/or other componentry illustrated in the Figures may belong to a system 100. In certain embodiments, the memory device 102 is, for example, an SSD or other storage device, or a NAND-based flash memory chip or module that encodes stored data using two levels of parity data, such as by utilizing the encoder 160 of the memory device 102. In certain embodiments, the memory device 102 may include any amount of componentry to facilitate the operation of the memory device 102. In certain embodiments, for example, the memory device 102 may include, but is not limited to including, a non-volatile memory 104, which may include any number of memory blocks, such as memory block 120 (e.g., Block A) and memory block 125 (e.g., Block B), a memory interface 101, a controller 106 (which may include an encoder 160 and/or a decoder 162), any other componentry, or a combination thereof. The memory device 102 may communicatively link with a host device 103, which may be or include a computer, server, autonomous vehicle, and/or any other computing device and/or system.

In certain embodiments, the controller 106 of the memory device 102 may be configured to control access to the non-volatile memory 104. In certain embodiments, user data 130 is provided by controller 106 to non-volatile memory 104, such as by utilizing memory interface 101. For example, the user data may be obtained from the host device 103 to be stored in the non-volatile memory 104, such as in memory block 120. In certain embodiments, the controller 106 may include an encoder 160 for generating ECC data (e.g., such as when writing data to the non-volatile memory 104), and decoder 162 for decoding ECC data (e.g., when reading data, such as from the non-volatile memory 104).

As indicated above, the memory device 102 may be configured to receive data (e.g., user data) to be stored from host device 103 (e.g., over a serial communications interface, or a wireless communications interface). In certain embodiments, memory device 102 stores the received data in memory cells (not explicitly shown) of non-volatile memory 104. In one example, the memory cells may be provided by one or more non-volatile memory chips. In one example, the memory chips may be NAND-based flash memory chips, however, any type of memory chips and/or combination of memory ships may also be utilized.

In certain embodiments, the memory device 102 implements error correction by generating ECC1 data 132 and ECC2 data 150 using user data 130. In certain embodiments, ECC2 data 150 may be extra ECC that has a higher error correction capability than ECC1 data 132. For example, as user data 130 is received from host device 103, the received data may be encoded using encoder 160 to provide the ECC1 and ECC2 data (e.g., parity bits). In certain embodiments, the controller 106 may implement error correction in hardware and/or software. In an example, the user data 130 may be video data from a mobile device of a user, sensor data from one or more sensors of an autonomous or other vehicle, text data, audio data, virtual reality data, augmented reality data, any type of data or a combination thereof.

In certain embodiments, as incoming user data 130 is received from host device 103, user data 130 may be stored in a memory block 120, along with ECC1 data 132 that has been generated by the encoder 160. In certain embodiments, the ECC2 data 150 may be stored in a separate memory block 125 of the memory device 102. The ECC2 data 150 may be stored in the separate memory block 125 so that the default code rate for the block 120 including the user data 130 and ECC1 data 132 may be higher than if the ECC2 data 150 was included in block 120. For example, the code rate without ECC2 data 150 in block 120 may be 0.9, whereas if the ECC2 data 150 was in block 120, the code rate may be 0.8, which would cause ECC data to occupy a greater percentage of the block 120 that could be used for user data 130. The ECC2 data 150 may be generated by encoder 160 as user data 130 is received from host device 103. In certain embodiments, for example, the ECC1 data and/or ECC2 data may be specifically designed to be utilized to recover user data 130 that experiences errors based on the occurrence of special events, such as, but not limited to, temperature changes (e.g., cause by infrared reflows), physical trauma experienced by the memory device 102, noise at power rails, voltage threshold disturbances during reading or writing of neighboring cells, retention loss due to leakage within the cells, and/or other events and/or conditions that may cause errors in the user data 130. In certain embodiments, the ECC2 data 150 may be stored in other memory of memory device 102. For example, in certain embodiments, ECC2 data 150 may be stored in a local memory of controller 106 and/or memory of host device 103. In certain embodiments, error correction using ECC2 data 150 may be performed by controller 106 and/or host device 103. In certain embodiments, the error correction may be performed by utilizing other componentry as well.

In the event that one or more errors are detected in the user data 130, such as after the occurrence of a special event, the user data 130 may be transmitted from the non-volatile memory 104 over memory interface 101 to the controller 106 for error correction using decoder 162. The error correction may be performed using ECC1 data 132 and/or ECC2 data 150 depending on the extent of estimated errors in user data 130, the type of the estimated errors, extent of actual errors, the type of actual errors, or a combination thereof. The decoder 162 may be utilized by the controller 106 to decode the ECC1 data 132 and/or ECC2 data 150 to recover and correct the user data 130. The corrected user data 130 may then be copied by the controller 106 to block 120 (e.g., Block A) by transmitted the corrected user data 130 to the non-volatile memory 104 via the memory interface 101.

Figure 2:
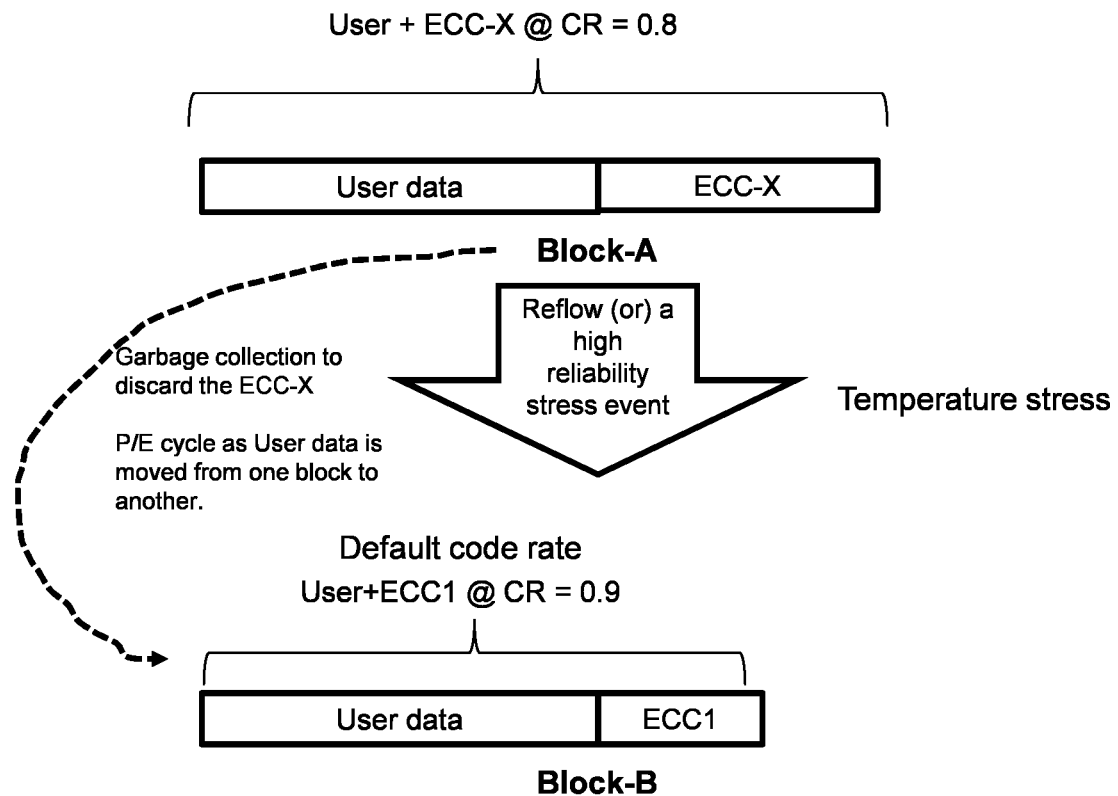
FIG. 2 shows an error handling flow for a memory device utilizing extra error correction code data to recover user data.

Referring now also to FIG. 2, FIG. 2 illustrates an error handling flow for a memory device utilizing extra error correction code data to recover user data 130 without using a multi-layer code rate architecture. In certain embodiments, the memory device may be memory device 102 from FIG. 1. In certain embodiments, the error handling flow may require the use of extra ECC protection to survive using a lower code rate. In FIG. 2, an exemplary block (e.g., Block A) may be configured to include both user data 130 and ECC1 plus ECC2 data to form ECC-X data. As an illustration, the user data 130 may occupy 80% of the capacity of the block and the ECC-X (ECC1+ECC2) data may occupy 20% of the capacity of the block. Without using a multi-layer code rate, the larger ECC (ECC-X) required to sustain a special event, such as temperature stress or a high reliability stress event, is embedded along with user data 130 in the same memory block. Once the special event occurs (e.g., temperature stress caused via infrared reflow caused by soldering the memory device 102 to a printed circuit board), retrieving the capacity of the block may require the execution of a garbage collection process.

In certain embodiments, for example, the garbage collection process may entail having the user data and ECC-X read into the controller (e.g., ASIC or other suitable component) from the memory device 102. The decoder 162 (e.g., a LDPC decoder) may recover the user data 130 with the assistance of the larger ECC-X (including ECC1 and ECC2 data) and the larger ECC-X may then be discarded (e.g., since the likelihood of another such high stress event may be low going forward). The recovered user data 130 may then be encoded at a larger rate (e.g., a default of 0.9, as shown in FIG. 2) after the user data 130 is recovered and written to a new block, such as Block-B in FIG. 2. For example, the newly encoded data may include user data 130 and ECC1 data 132 instead of ECC-X since less ECC capability may be needed going forward. With the garbage collection process, to write user data 130 before a special event (e.g., reflow) and also keep the user data 130 after reflow, two blocks of data are written and two program erase cycles per unit data are consumed. Additionally, in certain instances, NAND may downgrade the bits per cell to achieve the larger error rates, however, doing so results in a loss of capacity. Smaller code rates increase the software correction capability, but the amount of space taken by ECC to do so results in lower capacity for user data 130. To avoid and/or reduce the performance penalties brought on by the garbage collection process, an exemplary multi-layer code rate architecture for special event protection is provided in FIG. 3.

Figure 3:
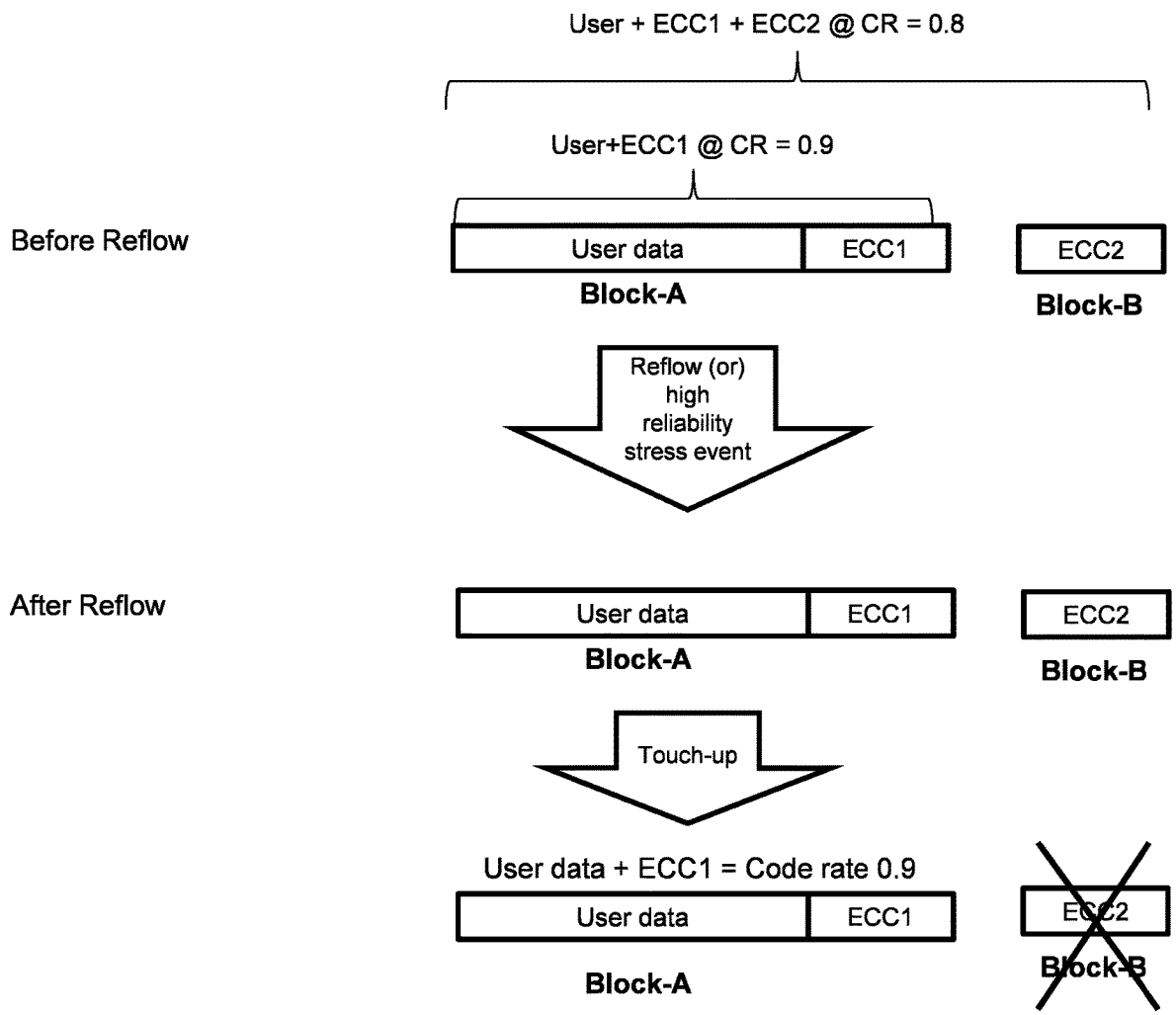
FIG. 3 shows an error handling flow for a memory device incorporating a multi-layer code rate architecture to provide special event protection using error correction with reduced performance penalty in accordance with embodiments of the present disclosure.

Referring now also to FIG. 3, FIG. 3 illustrates an error handling flow employing the use of a multi-layer code rate architecture that provides an opportunity to recover lost memory capacity from extra ECC bytes without having to run a garbage collection process on the user data 130. In particular, the combination of a smaller code rate (with extra ECC) and the multilayer implantation (with extra ECC written to a separate block) avoids the need for garbage collecting user data 130 and enhances performance. Before a stress event occurs, the system including the memory device 102 uses extra ECC for host user data (e.g., user data 130). The extra ECC may be implanted by utilizing a multi-layered code. For example, the user data 130 and ECC1 data for correcting errors may be encoded using encoder 160 and written to a first block 120 (e.g., Block-A in FIG. 3) (e.g., with a code rate of 0.9—the ECC1 taking 10% of the capacity and the user data 130 taking the remaining 90%). The extra ECC (e.g., ECC2) may be written to a separate memory block 125 (e.g., Block-B). The cumulative code rate for both the first block and second block may be 0.8 in this example, as shown at the top of FIG. 3 (with ECC1+ECC2 taking 0.2 of the combination of Block A and Block B).

Based on a notification that the stress event has occurred and/or completed (e.g., such as from host device 103 providing a notification to the memory device 102), the controller 106 (or other suitable component or device) may scan the data encoded with extra-ECC. In certain embodiments, the scan may include scanning each memory page of the memory block(s). If the scanning indicates that a page cannot continue to meet memory reliability requirements (e.g., being within a particular reliability margin) without the extra ECC, the page is put through a touch-up process, which the controller 106 (or other appropriate component and/or device) may execute. The touch-up process may include rewriting the user data on already written pages to reset the reliability margins such that the page satisfies the memory reliability requirements for the system. For example, in FIG. 3, the user data 130 and ECC1 132 may be written to block 120 (i.e., Block A) instead of writing the user data 130 and ECC1 132 to a separate block as in the example provided in FIG. 2. In certain embodiments, the touch-up process may reinstate the health of block 120 (i.e., Block A) such that the extra ECC is no longer necessary. In certain embodiments, the touch-up process may include reprogramming the user data 130 to Block A. In certain embodiments, the user data 130 on a page of memory may be in the form of voltage (vt) distributions, and, with time, the vt distributions may have lost charge and the vt distributions may have shifted left and may have lost some vt. In certain embodiments, the touch-up may include doing a shift (e.g., a fine shift) in the threshold voltage so that a full voltage may be achieved so that vt distributions may be in a desired range and charge may be restored to a desired level. The ECC2 150 may then be deleted from block 125 (i.e., Block B) and the memory capacity of block 125 may be returned to the pool of memory blocks that may be utilized to store user data 130 or other data, thereby reclaim memory capacity that was previously used for ECC2. If, however, the scanning indicates that the page(s) do satisfy the memory reliability requirements, the touch-up process may be avoided or bypassed and ECC2 may be deleted from block 125 (i.e., Block B) and the capacity may be reclaimed for user data 130 or other user data. Although the touch-up process avoids the need for rewriting the user data and ECC1 data to a new memory block, the touch-up process may cause some level of performance penalty due to the write operations conducted. Nevertheless, touch-up conducted on a need basis avoids such overhead and does not add significant wear to the blocks to which data is being written to.

Figure 4:
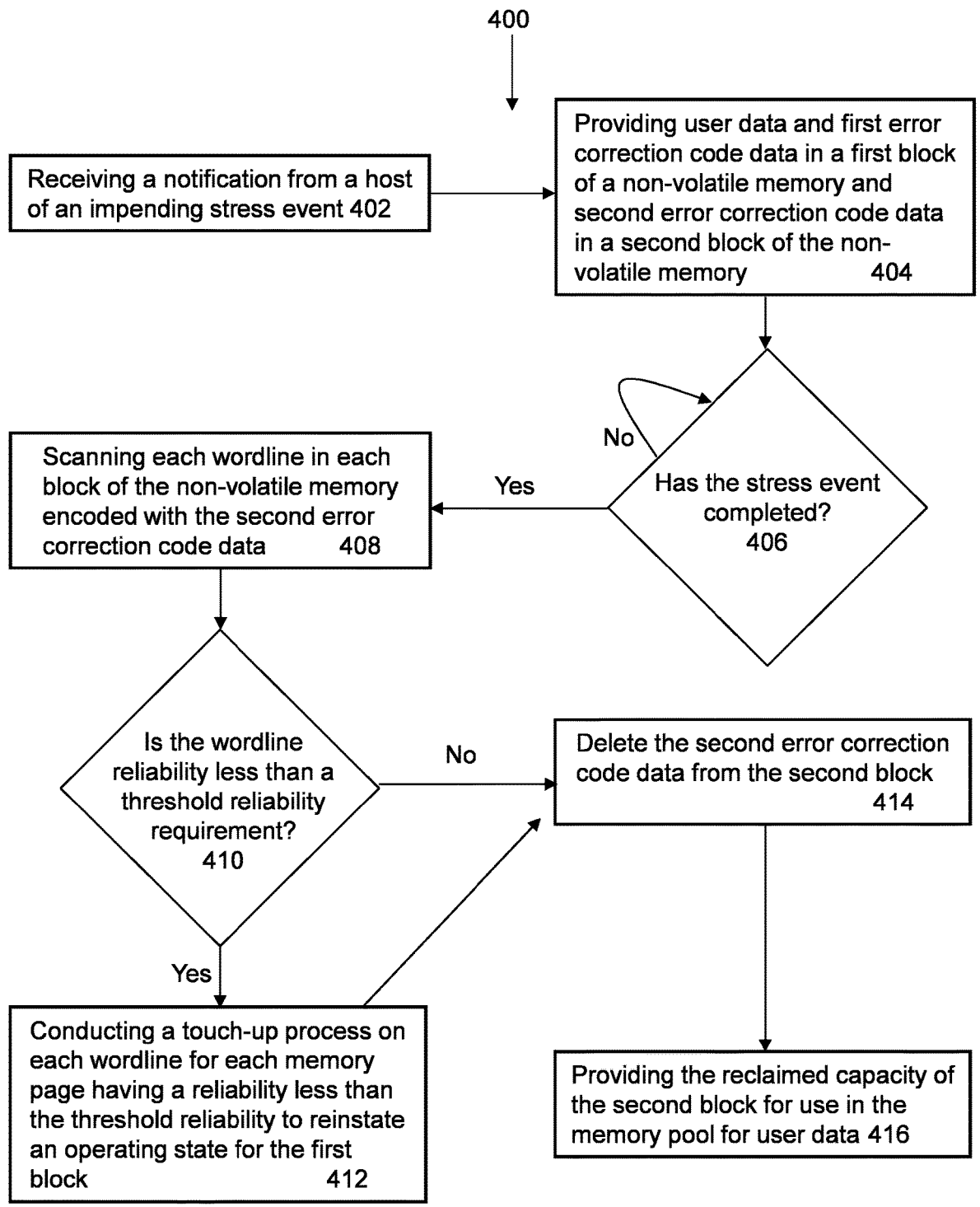
FIG. 4 shows an exemplary method for providing a multi-layer code rate architecture to provide special event protection with reduced performance penalty according to embodiments of the present disclosure.

Referring now also to FIG. 4, FIG. 4 illustrates a method 400 for providing a multi-layer code rate architecture for providing special event protection with reduced performance penalty according to embodiments of the present disclosure. For example, the method of FIG. 4 can be implemented in the system of FIG. 1 and/or any of the other systems illustrated in the Figures. In certain embodiments, the method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., controller 106 of FIG. 1). Although shown in a particular sequence or order, unless otherwise specified, the order of the processes may be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 400 may include steps for utilizing a multi-layer code architecture to effectively recover data that contain errors that result from stress events, such as infrared flows and/or other types of physical or other trauma. In certain embodiments, the method 400 may be performed may be utilized the systems 100, 500, 600 and/or by utilizing any combination of the componentry contained therein. At step 402, the method 400 may include receiving a notification from a host of an impending stress event. For example, the host device 103 (and/or host system 520) may transmit a notification via an interface and/or communication channel to the memory device 102 (and/or memory sub-system 510) of an impending stress event that may cause errors in user data 130 stored in the memory device 102. For example, the event may be an infrared reflow event resulting from soldering the memory device 102 onto a chip with other componentry. Other events may include physical trauma to the memory device 102, extremes in temperature, noise at power rails, voltage threshold disturbances during reading or writing of neighboring cells, or retention loss due to leakage within the cells, and/or other types of stress events. In certain embodiments, the notification may indicate when the stress event is to occur and the type of stress event. In certain embodiments, the event may or may not happen and/or the event may cause less damage than anticipated.

At step 404, the method 400 may include implementing extra ECC by utilizing a multi-layered code rate architecture for the user data 130. For example, the encoder 160 may encode the user data 130 received from the host device 103 with ECC1 132 at a default code rate in a first block 120 (e.g., Block A) and may encode extra ECC (ECC2 150) in a separate second block (e.g., Block B). At step 406, the method 400 may include determining whether the stress event has completed. In certain embodiments, the determination may result from receiving a notification from the host device 103 indicating that the stress event is now over. For example, the host device 103 may transmit a notification indicating that a soldering process is complete. If the stress event has not completed, the method 400 may continue with step 406 until the stress event has completed. If, however, the stress event has completed, the method 400 may proceed to step 408, which may include scanning each page in the block containing the user data 130. For example, the scanning may comprise having the controller 106 scan each wordline in each page of each block of the non-volatile memory 104 encoded with the extra ECC. In certain embodiments, the scanning may reveal that either the full memory or part of the memory may have sufficient healthy margins to continue without extra ECC for normal memory usage.

At step 410, the method 400 may include determining if the wordline (and/or other aspect of memory) reliability is less than a threshold reliability requirement. For example, the controller 106 may determine and/or identify pages and/or wordlines that have reliability below the threshold reliability requirement. If, at step 410, the method 400 includes determining that the wordline reliability is less than the threshold reliability requirement, the method 400 may proceed to step 412. At step 412, the method 400 may include conducting a touch-up process on each wordline for each memory page having a reliability less than the threshold reliability. The touch-up process may be utilized to reinstate the health and/or operating state of the block containing the user data 130 (e.g., block 120/Block A). In certain embodiments, the touch-up process may include rewriting the data (e.g., user data) on already written pages of the memory to reset reliability margins and to satisfy the threshold reliability requirements. The reliability margins may comprise a range of reliability within which the memory needs to operate to function as desired. In certain embodiments, the rewriting may be performed based on decoding the ECC1 data, the ECC2 data, or a combination thereof, such as by utilizing decoder 162. In certain embodiments, the rewriting of the data may be done without the need of the garbage collection process described above. In certain embodiments, by conducting to the touch-up process on as needed basis, performance penalties due to write operations may be avoided or reduced.

Once the wordlines below the reliability threshold are touched-up, the method 400 may proceed to step 414, which may include deleting the ECC2 data 150 from the block 125 (i.e., Block B) since the extra ECC is no longer needed. The method 400 may then proceed to step 416, which may include providing the reclaimed capacity of the block 125 for use in a pool of memory resources that may be utilized to store user data 130 and/or other user data received from the host 103. If, however, at step 410, the wordline reliability is not less than the threshold reliability requirement, the method 400 may bypass step 412, and proceed directly to step 414 from step 410. At step 414, the method 400 may include deleting the ECC2 data 150 from the block 125 since the extra ECC is not needed. The method 400 may proceed to step 416, which may include providing the reclaimed capacity of the block 125 for use in a pool of memory resources and/or blocks that may be utilized to store user data 130 and/or other data. Notably, the method 400 may incorporate any of the other functionality as described herein and may be adapted to support the functionality of the systems 100, 500, and 600.

Notably, additional functionality and features may be provided. In certain embodiments, the second ECC data may be generated using the first ECC data. In certain embodiments, the combination of the first and second ECC data may be a concatenation of the first and second ECC data. In certain embodiments, generating the first ECC data may comprise generating a first parity check matrix (e.g., H matrix). In certain embodiments, generating the second ECC data comprises generating a second parity check matrix (e.g., $\hat{H}$ matrix) using the first parity check matrix. In certain embodiments, the second ECC data is stored in memory cells (e.g., second SLC block(s)) each configured to store a single bit of data. In certain embodiments, the first ECC data corresponds to a first code rate (e.g., 0.9 for ECC1), the second ECC data corresponds to a second code rate (e.g., 0.8 for ECC1+ECC2), and the second code rate may be smaller than the first code rate.

Figure 5:
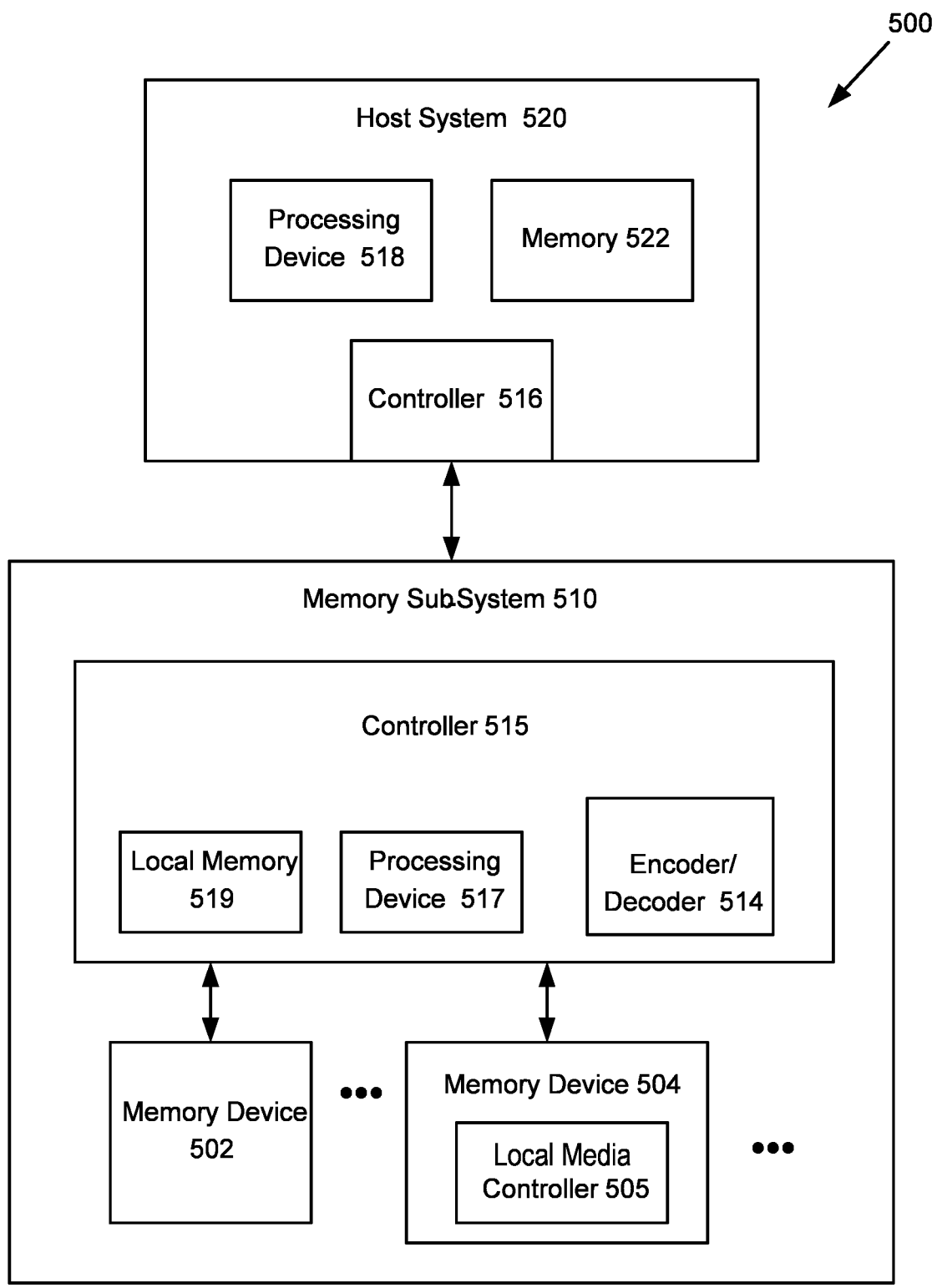
FIG. 5 shows an example computing system that includes a memory sub-system utilized to provide special event protection using error correction with reduced performance penalty in accordance with embodiments of the present disclosure.

Referring now also to FIG. 5 illustrates an exemplary computing system 500 that includes a memory sub-system 510 and a host system 520 in accordance with embodiments of the present disclosure. The computing system 500 may be utilized to implement the functionality supporting the multi-layer code rate architecture for providing special event protection, while also ensuring reduced memory performance penalties. For example, in certain embodiments, multi-level/layer encoding may be utilized to encode data (e.g. user data) for storage in the memory sub-system 510. For example, ECC1 data 132 and ECC2 150 data may be stored in separate memory blocks, as discussed herein, and may be utilized to recover data that may have errors resulting from events, such as infrared reflow and/or other stress events. In certain embodiments, the memory sub-system 510 may be a storage device (e.g., memory device 102), a memory module, and/or a hybrid of a storage device and memory module. In certain embodiments, the computing system 500 may also include the host system 520 that may utilize the memory sub-system 510 that may include one or more components, such as memory devices that store data. In certain embodiments, the host system 520 may provide data to be stored at the memory sub-system 510 and may request data to be retrieved from the memory sub-system 510. In certain embodiments, the computing system 500 may be combined with system 100 and/or system 600 and/or support the functionality of systems 100, 600.

In certain embodiments, memory sub-system 510 can include media, such as one or more volatile memory devices (e.g., memory device 502), one or more non-volatile memory devices (e.g., memory device 504), or a combination thereof. Memory device 102 of FIG. 1 may be an example of memory sub-system 510, and host device 103 may be an example of host system 520. The memory sub-system 510 may be a storage device, a memory module, or a hybrid of a storage device and memory module. In certain embodiments, a storage device may include a solid-state drive (SSD), a flash drive, a universal serial bus (USB) flash drive, an embedded Multi-Media Controller (eMMC) drive, a Universal Flash Storage (UFS) drive, a secure digital (SD) card, and/or a hard disk drive (HDD). In certain embodiments, memory modules may include a dual in-line memory module (DIMM), a small outline DIMM (SO-DIMM), and various types of non-volatile dual in-line memory module (NVDIMM).

In certain embodiments, the computing system 500 may be, for example, a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), wearable device, and/or any computing device that may include a memory device and a processing device. The computing system 500 may include the host system 520 that is coupled to one or more memory sub-systems 510. FIG. 5 illustrates one example of a host system 520 coupled to a memory sub-system 510. In certain embodiments, the host system 520 may include a processor chipset (e.g., processing device 518) and/or a software stack executed by the processor chipset. In certain embodiments, the processor chipset may include one or more cores, one or more caches, a memory controller (e.g., controller 516) (e.g., NVDIMM controller), and a storage protocol controller (e.g., PCIe controller, SATA controller). In certain embodiments, the host system 520 may use the memory sub-system 510, for example, to write data to the memory sub-system 510 and read data from the memory sub-system 510.

In certain embodiments, the host system 520 may be coupled to the memory sub-system 510 via a physical host interface. The physical host interface may include, but is not limited to, a Serial Advanced Technology Attachment (SATA) interface, a Peripheral Component Interconnect Express (PCIe) interface, Universal Serial Bus (USB) interface, Fibre Channel, Serial Attached SCSI (SAS), a Double Data Rate (DDR) memory bus, Small Computer System Interface (SCSI), a Dual In-line Memory Module (DIMM) interface (e.g., DIMM socket interface that supports Double Data Rate (DDR)), Open NAND Flash Interface (ONFI), Double Data Rate (DDR), Low Power Double Data Rate (LPDDR), and/or any other interface. The physical host interface may be utilized to transmit data between the host system 520 and the memory sub-system 510. The host system 720 may further utilize an NVM Express (NVMe) interface to access components (e.g., memory devices 504) when the memory sub-system 510 is coupled with the host system 520 by the PCIe interface. The physical host interface may provide an interface for passing control, address, data, and other signals between the memory sub-system 510 and the host system 520. In certain embodiments, the host system 520 may be configured to access multiple memory sub-systems 510 via a same communication connection, multiple separate communication connections, and/or a combination of communication connections.

In certain embodiments, the processing device 518 of the host system 520 may be, for example, a microprocessor, a central processing unit (CPU), a processing core of a processor, an execution unit, and the like. In certain embodiments, the controller 516 may be referred to as a memory controller, a memory management unit, and/or an initiator. In certain embodiments, the controller 516 controls the communications over a bus coupled between the host system 520 and the memory sub-system 510. In certain embodiments, the controller 516 may send commands or requests to the memory sub-system 510 for desired access to memory devices 502, 504. The controller 516 may further include interface circuitry to communicate with the memory sub-system 510. The interface circuitry may convert responses received from memory sub-system 510 into information for the host system 520. In certain embodiments, the controller 516 of the host system 520 can communicate with controller 515 of the memory sub-system 510 to perform operations such as, but not limited to, reading data, writing data, and/or erasing data at the memory devices 502, 504 and other operations. In certain embodiments, the controller 516 may be integrated within the same package of the processing device 518. In certain embodiments, the controller 516 may be separate from the package of the processing device 518. The controller 516 and/or the processing device 518 may include hardware such as one or more integrated circuits (ICs) and/or discrete components, a buffer memory, a cache memory, or a combination thereof. The controller 516 and/or the processing device 518 may be a microcontroller, special purpose logic circuitry (e.g., a Field Programmable Gate Array (FPGA), an Application Specific Integrated Circuit (ASIC), etc.), or another suitable processor.

The memory devices 502, 504 may include any combination of different types of non-volatile memory components and/or volatile memory components. The volatile memory devices (e.g., memory device 502) may be, but are not limited to, Random Access Memory (RAM), such as Dynamic Random Access Memory (DRAM) and Synchronous Dynamic Random Access Memory (SDRAM). Some examples of non-volatile memory components may include a Negative-AND (NAND) type flash memory and write-in-place memory, such as three-dimensional cross point memory. A cross point array of non-volatile memory may perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 504 can include one or more arrays of memory cells. SLCs, for example, can store one bit per cell. Other types of memory cells, such MLCs, TLCs, QLCs, and penta-level cells (PLCs) can store multiple bits per cell. In certain embodiments, each of the memory devices 504 may include one or more arrays of memory cells such as SLCs, MLCs, TLCs, QLCs, or any combination thereof. In certain embodiments, a particular memory device can include an SLC portion, and an MLC portion, a TLC portion, or a QLC portion of memory cells. The memory cells of the memory devices 504 may be grouped as pages that can refer to a logical unit of the memory device used to store data. With some types of memory (e.g., NAND), pages can be grouped to form blocks.

Although non-volatile memory devices such as 3D cross point type and NAND type memory (e.g., 2D NAND, 3D NAND) are described, the memory device 504 can be based on any other type of non-volatile memory, such as Read-Only Memory (ROM), Phase Change Memory (PCM), self-selecting memory, other chalcogenide based memories, Ferroelectric Transistor Random-Access Memory (FeTRAM), Ferroelectric Random Access Memory (FeRAM), Magneto Random Access Memory (MRAM), Spin Transfer Torque (STT)-MRAM, Conductive Bridging RAM (CBRAM), Resistive Random Access Memory (RRAM), Oxide based RRAM (OxRAM), Negative-OR (NOR) flash memory, and Electrically Erasable Programmable Read-Only Memory (EEPROM).

In certain embodiments, the memory sub-system controller 515 (or controller 515 for simplicity) can communicate with the memory devices 504 to perform operations such as, but not limited to, reading data, writing data, and/or erasing data at the memory devices 504 and other such operations (e.g., in response to commands scheduled on a command bus by controller 516). In certain embodiments, the controller 515 can include hardware, such as one or more Integrated Circuits (ICs) and/or discrete components, a buffer memory, or a combination thereof. The hardware can include digital circuitry with dedicated (i.e., hard-coded) logic to perform the operations described herein. The controller 515 can be a microcontroller, special purpose logic circuitry (e.g., a Field Programmable Gate Array (FPGA), an Application Specific Integrated Circuit (ASIC), etc.), or another suitable processor. The controller 515 can include a processing device 517 (i.e., a processor) configured to execute instructions stored in a local memory 519. In the illustrated example, the local memory 519 of the controller 515 may include an embedded memory configured to store instructions for performing various processes, operations, logic flows, and routines that control operation of the memory sub-system 510, including handling communications between the memory sub-system 510 and the host system 520.

In certain embodiments, the local memory 519 may include memory registers storing memory pointers, fetched data, and the like. The local memory 519 can also include Read-Only Memory (ROM) for storing micro-code. While the example memory sub-system 510 in FIG. 5 is illustrated as including the controller 515, in certain embodiments of the present disclosure, a memory sub-system 510 may not include a controller 515, and may instead rely upon external control (e.g., provided by an external host, or by a processor or controller separate from the memory sub-system). In certain embodiments, the controller 515 may receive commands or operations from the host system 520 and can convert the commands or operations into instructions or appropriate commands to achieve the desired access to the memory devices 504. The controller 515 can be responsible for other operations such as wear leveling operations, garbage collection operations, error detection and error correction code (ECC) operations, encryption operations, caching operations, and address translations between a logical address (e.g., Logical Block Address (LBA), namespace) and a physical address (e.g., physical block address) that are associated with the memory devices 504.

In certain embodiments, the controller 515 can further include host interface circuitry to communicate with the host system 520 via the physical host interface. The host interface circuitry can convert the commands received from the host system into command instructions to access the memory devices 504 as well as convert responses associated with the memory devices 504 into information for the host system 520. In certain embodiments, the memory sub-system 510 can also include additional circuitry or components that are not illustrated. In some embodiments, the memory sub-system 510 can include a cache or buffer (e.g., DRAM) and address circuitry (e.g., a row decoder and a column decoder) that can receive an address from the controller 515 and decode the address to access the memory devices 504.

In certain embodiments, the memory devices 504 include local media controllers 505 that operate in conjunction with memory sub-system controller 515 to execute operations on one or more memory cells of the memory devices 504. An external controller (e.g., memory sub-system controller 515) can externally manage the memory device 504 (e.g., perform media management operations on the memory device 504). In certain embodiments, the memory device 504 is a managed memory device, which may be a raw memory device combined with a local controller (e.g., local media controller 505) for media management within the same memory device package. An example of a managed memory device is a Managed NAND (MNAND) device.

In certain embodiments, the computing system 500 may include a multi-level encoder/decoder 514 in the memory sub-system 510 that uses multiple error correction codes (e.g., ECC1 132 and ECC2 150) to convert data and/or generate corresponding parity data for storing in media cells of memory devices 502 to 504. In certain embodiments, the controller 515 in the memory sub-system 510 includes at least a portion of the multi-level encoder/decoder 514. In certain embodiments, or in combination, the controller 516 and/or the processing device 518 in the host system 520 may include at least a portion of the multi-level encoder/decoder 514. For example, the controller 515, the controller 516, and/or the processing device 518 can include logic circuitry implementing the multi-level encoder/decoder 514. For example, the controller 515 and/or the processing device 518 (processor) of the host system 520, may be configured to execute instructions stored in memory for performing the operations of the multi-level encoder/decoder 514. In certain embodiments, the multi-level encoder/decoder 514 may be implemented in an integrated circuit chip disposed in the memory sub-system 510. In certain embodiments, the multi-level encoder/decoder 514 is part of an operating system of the host system 520, a device driver, and/or an application.

In certain embodiments, a communication channel between the processing device 518 and a memory sub-system 510 may include a computer network, such as a local area network, a wireless local area network, a wireless personal area network, a cellular communications network, a broadband high-speed always-connected wireless communication connection (e.g., a mobile network link), or a combination thereof. The processing device 518 and the memory sub-system can be configured to communicate with each other using data storage management and usage commands similar to those in NVMe protocol.

In certain embodiments, the memory sub-system 510 may include non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, Phase-Change Memory (PCM), Magnetic Random Access Memory (MRAM), resistive random-access memory, cross point storage and memory devices. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In certain embodiments, the controller (e.g., controller 515) of a memory sub-system (e.g., memory sub-system 510) can run firmware to perform operations responsive to the communications from the processing device 518. Firmware in general is a type of computer program that provides control, monitoring and data manipulation of engineered computing devices. Some embodiments involving the operation of the controller 515 can be implemented using computer instructions executed by the controller 515, such as the firmware of the controller 515. In certain embodiments, hardware circuits can be used to implement at least some of the functions. The firmware may be initially stored in the non-volatile storage media, or another non-volatile device, and loaded into the volatile DRAM and/or the in-processor cache memory for execution by the controller 515.

A non-transitory computer-readable medium can be used to store instructions of the firmware of a memory sub-system (e.g., memory sub-system 510). When the instructions are executed by the controller 515 and/or the processing device 517, the instructions cause the controller 515 and/or the processing device 51 to perform a method (e.g. method 400) discussed herein. In certain embodiments, a method (e.g., implemented in memory sub-system 710) recovers user data using multi-layer code rates as described for FIG. 1 and elsewhere in the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed at least in part by the multi-level encoder/decoder 714 of FIG. 5.

In certain embodiments, a multi-level encoder/decoder 514 decodes data retrieved from memory cells and/or blocks based on a first error correction code (e.g., ECC1 132; which may be a low-density parity-check code). The multi-level encoder/decoder 514 may determine whether the decoding according to the first error correction code (e.g., ECC1 132) is successful. When all codewords generated using the first error correction code (e.g., ECC1 132) can be successfully decoded and/or recovered via the parity data, the original data based on which the encoded data is generated, stored in and then retrieved from the memory cells may be recovered successfully and can be copied (e.g., to block 120). On the other hand, if some of the codewords cannot be successfully decoded according to the first error correction code (e.g., ECC1 132), the multi-level encoder/decoder 514 identifies symbols that cannot be successfully decoded via the first error correction code. In certain embodiments, unsatisfied parity checks in an LDPC code can be used to identify bits in an LDPC codeword that cannot be reliably decoded. The identified symbols can be considered as missing/being erased. The second error correction code (e.g., ECC2 150) along with the first error correction code (e.g., ECC1 132) can then be used to decode those few ambiguous symbols (e.g., using parity data stored as ECC2 data 150). Decoding according to the second error correction code can be performed to recover the missing/erased symbols. The multi-level encoder/decoder 514 may recover the identified symbols based on, for example, ECC1 132 and ECC2 150. In one example, the recovered symbols can be used to replace the corresponding symbols retrieved from the memory cells and further decoded for data recovery via the first error correction code (e.g., a low-density parity-check code).

Figure 6:
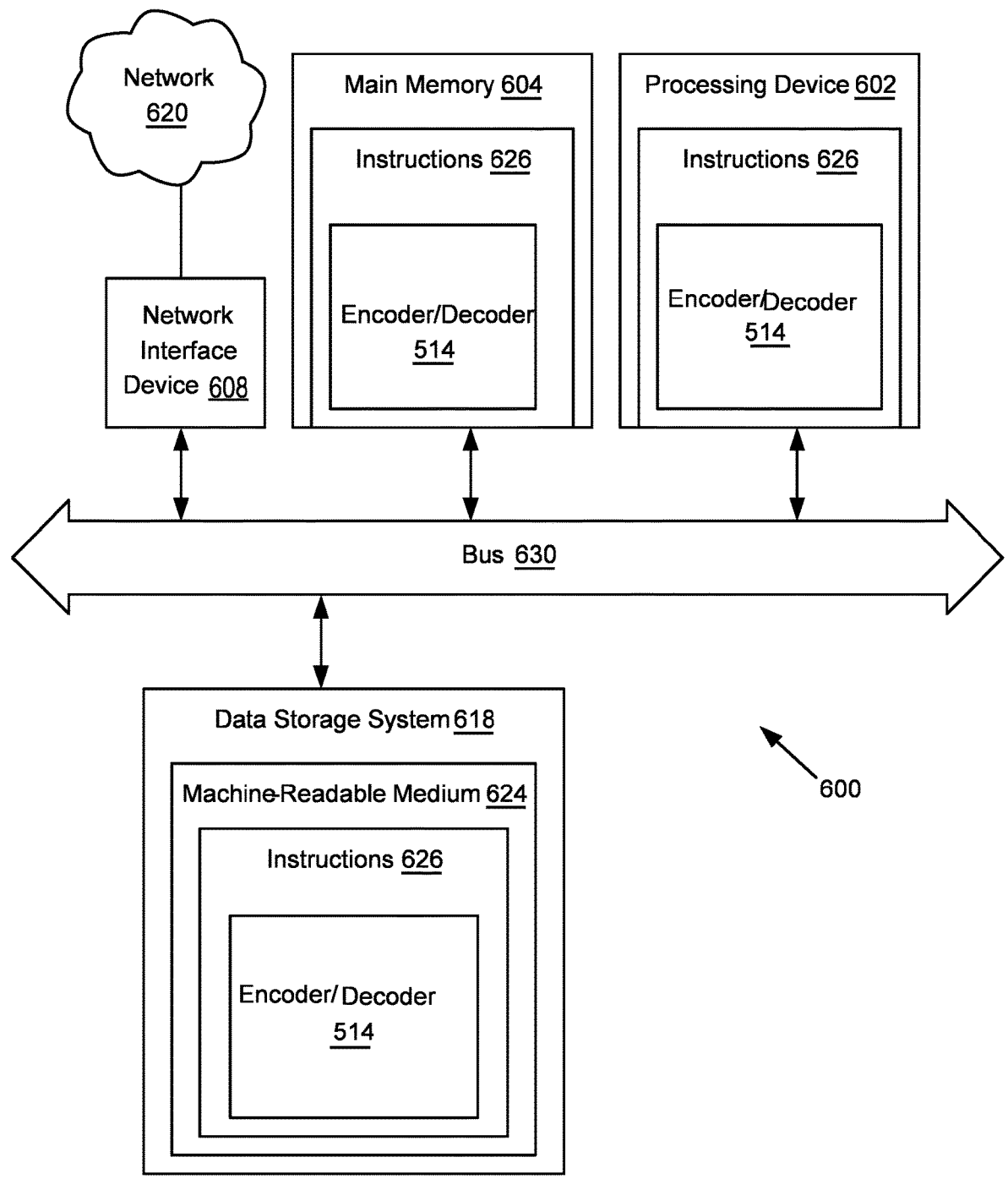
FIG. 6 is a block diagram of an example computer system in which embodiments and/or features and/or functionality of the present disclosure can operate.

FIG. 6 illustrates an exemplary machine of a computer system 600 within which a set of instructions, for causing the machine to perform any one or more of the methodologies discussed herein, can be executed. In certain embodiments, the computer system 600 can correspond to a host system (e.g., the host system 520 of FIG. 5) that includes, is coupled to, or utilizes a memory sub-system (e.g., the memory sub-system 510 of FIG. 5), or can be used to perform the operations of encoder/decoder 514 (e.g., to execute instructions to perform operations corresponding to the encoder/decoder 514 described with reference to FIG. 5). In certain embodiments, computer system 600 corresponds to memory device 102, and/or host device 103. In certain embodiments, the machine may be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. In certain embodiments, the machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In certain embodiments, the exemplary computer system 600 may include a processing device 602, a main memory 604 (e.g., read-only memory (ROM), flash memory, dynamic random-access memory (DRAM) such as synchronous DRAM (SDRAM) or Rambus DRAM (RDRAM), static random access memory (SRAM), etc.), and/or a data storage system 618, which are configured to communicate with each other via a bus 630 (which can include multiple buses). In certain embodiments, processing device 602 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. In certain embodiments, the processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. In certain embodiments, computer system 600 may further include a network interface device 608 to communicate over a network 620.

The data storage system 618 can include a machine-readable storage medium 624 (also referred to as a computer-readable medium herein) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 510 of FIG. 5. In certain embodiments, the instructions 626 may include instructions to implement functionality corresponding to multi-level error correction for copying supported by an encoder/decoder as described above (e.g., for FIG. 1) (e.g., the encoder/decoder 514 described with reference to FIG. 5).

The disclosure includes various devices which perform the methods and implement the systems described above, including data processing systems which perform the methods, and computer-readable media containing instructions which when executed on data processing systems cause the systems to perform the methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrases "in one embodiment" and "in certain embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments, but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
a non-volatile memory configured to store data in memory cells; and
a controller configured to:
provide user data and first error correction code data in a first block of the non-volatile memory, wherein the first error correction code data provides a capability for correcting at least one error in the user data;

provide second error correction code data in a second block of the non-volatile memory, wherein the second error correction code data provides an additional capability for correcting the at least one error in the user data;

determine whether a stress event affecting the non-volatile memory has completed;

scan, based on the stress event being determined to be completed, the user data in the first block;

determine, based on the scanning, whether the first block of the non-volatile memory is capable of satisfying a threshold reliability requirement without utilizing the second error correction code data in the second block;

execute, based on the first block being determined to not be capable of satisfying the threshold reliability requirement, a touch-up process on the first block to reinstate an operating state of the first block such that the second block is no longer needed for error correction of the user data; and delete the second error correction code data from the second block, thereby retrieving capacity of the second block of the non-volatile memory.

2. The system of claim 1, wherein the controller is further configured to avoid the touch-up process for the first block based on the first block being determined to be capable of satisfying the threshold reliability requirement.

3. The system of claim 1, wherein the controller is further configured to avoid conducting a garbage collection process on the first block based on separating the second error correction code data in the second block from the first error correction code data and the user data in the first block.

4. The system of claim 1, wherein the stress event comprises an infrared reflow that subjects the non-volatile memory to a temperature change, a trauma experienced by the non-volatile memory, or a combination thereof.

5. The system of claim 1, wherein the controller is further configured to generate a notification at completion of the stress event.

6. The system of claim 1, wherein the controller is further configured to provide the second block to a pool of blocks available for the user data, other user data, or a combination thereof, after deleting the second error correction code data.

7. The system of claim 1, wherein the controller is further configured to receive a notification from a host indicating that the stress event is impending.

8. The system of claim 1, wherein the controller is further configured to recover the user data after the stress event has completed based on the first error correction code data, the second error correction code data, or a combination thereof.

9. The system of claim 1, wherein the controller is further configured to rewrite the user data using the touch-up process to reset a reliability margin for the first block of the non-volatile memory.

10. The system of claim 1, wherein the controller is further configured to scan each wordline in the first block of the non-volatile memory encoded with the second error correction code data.

11. The system of claim 10, wherein the controller is further configured to execute the touch-up process on each wordline in the first block encoded with the second error correction code data that does not satisfy the threshold reliability requirement.

12. The system of claim 1, wherein the controller is further configured to encode the user data using the first error correction code data at a default code rate.

13. The system of claim 12, wherein the controller is further configured to rewrite the user data to the first block via the touch-up process while maintaining the default code rate for the first block.

14. A method, comprising:

providing, by a controller of a non-volatile memory, user data and first error correction code data in a first block of the non-volatile memory, wherein the first error correction code data provides a capability for correcting at least one error in the user data;

providing, by the controller of the non-volatile memory, second error correction code data in a second block of the non-volatile memory, wherein the second error correction code data provides an additional capability for correcting the at least one error in the user data;

determining whether a stress event affecting the non-volatile memory has completed;

scanning, by the controller of the non-volatile memory and based on the stress event being determined to be completed, the first block;

determining, based on the scanning, whether the first block of the non-volatile memory is capable of satisfying a threshold reliability requirement without utilizing the second error correction code data in the second block;

executing, by the controller of the non-volatile memory and based on the first block being determined to is-not be capable of satisfying the threshold reliability requirement, a touch-up process on the first block to reinstate an operating state of the first block such that the second block is no longer needed for error correction of the user data; and deleting the second error correction code data from the second block, thereby retrieving capacity of the second block of the non-volatile memory.

15. The method of claim 14, further comprising avoiding the touch-up process based on the first block being determined to be capable of satisfying the threshold reliability requirement.

16. The method of claim 14, further comprising providing the second block to a user data pool for use after deleting the second error correction code data from the second block.

17. The method of claim 14, further comprising receiving a notification indicating that the stress event is impending.

18. The method of claim 14, further comprising scanning each page, each wordline, or a combination thereof, in the first block.

19. The method of claim 18, further comprising executing the touch-up process only on each page, each wordline, or a combination thereof, not capable of satisfying the threshold reliability requirement to reduce overhead.

20. A non-volatile memory, comprising:

a controller configured to:

provide user data and first error correction code data in a first block of the non-volatile memory, wherein the first error correction code data provides a capability for correcting at least one error in the user data;

provide second error correction code data in a second block of the non-volatile memory, wherein the second error correction code data provides an additional capability for correcting the at least one error in the user data;

determine whether a stress event affecting the non-volatile memory has completed;

scan, based on the stress event being determined to be completed, the user data in the first block;

determine, based on the scanning, whether the first block of the non-volatile memory is capable of satisfying a threshold reliability requirement without utilizing the second error correction code data in the second block;

execute, based on the first block being determined to not be capable of satisfying the threshold reliability requirement, a touch-up process on the first block to reinstate an operating state of the first block such that the second block is no longer needed for error correction of the user data and the at least one error is corrected; and delete the second error correction code data from the second block, thereby retrieving capacity of the second block of the non-volatile memory.

\* \* \* \* \*